United States Patent [19]

Chiba et al.

[11] 4,369,981

[45] Jan. 25, 1983

[54] FUEL TANK FITTING STRUCTURE

[75] Inventors: Akio Chiba; Jun Funahashi, both of Yokohama, Japan

[73] Assignee: Nissan Motor Company, Ltd., Yokohama, Japan

[21] Appl. No.: 241,208

[22] Filed: Mar. 6, 1981

[30] Foreign Application Priority Data

Mar. 7, 1980 [JP] Japan ................................. 55-28114

[51] Int. Cl.³ ........................ B60K 15/08; B60R 21/10
[52] U.S. Cl. ..................................... 280/5 A; 280/801
[58] Field of Search ....................... 280/5 A, 5 R, 801; 297/463, 468, 483

[56] References Cited

U.S. PATENT DOCUMENTS

| | | | |
|---|---|---|---|
| 2,808,892 | 10/1957 | Walker | 280/5 A |
| 2,846,231 | 8/1958 | Fritz | 280/5 A |
| 3,697,093 | 10/1972 | Cadiou | 280/5 A |
| 4,093,254 | 6/1978 | Ezaki | 280/5 A |

FOREIGN PATENT DOCUMENTS

| | | |
|---|---|---|
| 6801405 | 10/1968 | Fed. Rep. of Germany . |
| 2621922 | 1/1977 | Fed. Rep. of Germany . |
| 2828715 | 9/1979 | Fed. Rep. of Germany ..... 280/5 A |
| 1420497 | 11/1965 | France . |

*Primary Examiner*—Joseph F. Peters, Jr.
*Assistant Examiner*—Donn McGiehan
*Attorney, Agent, or Firm*—Thompson, Birch, Gauthier & Samuels

[57] ABSTRACT

A structure for fitting a fuel tank in an automotive vehicle comprises a rear floor panel fixed at a rear portion of the automotive vehicle, a rear seat cross member fixed to the under side of the rear floor panel across the automotive vehicle, a seat belt anchor fixing cross member fixed to the under side of the rear floor panel across the automotive vehicle, and a pair of bands suspended between the rear seat cross member and the seat belt anchor fixing cross member for supporting the fuel tank in position between the rear seat cross member and the seat belt anchor fixing cross member.

8 Claims, 9 Drawing Figures

FIG. I
(PRIOR ART)
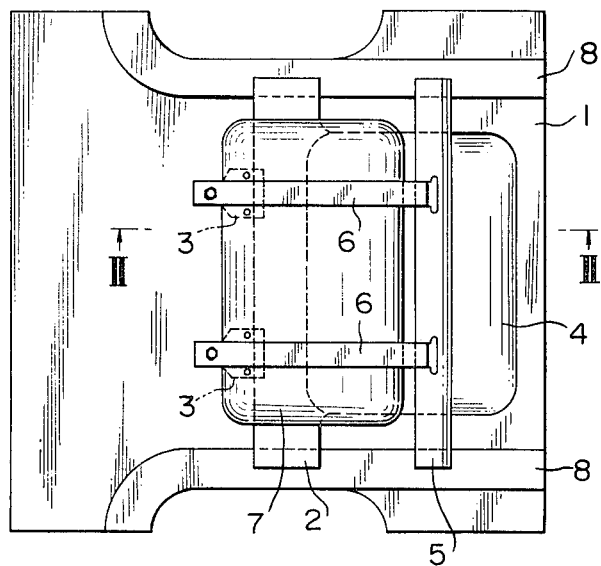
FIG. 2
(PRIOR ART)
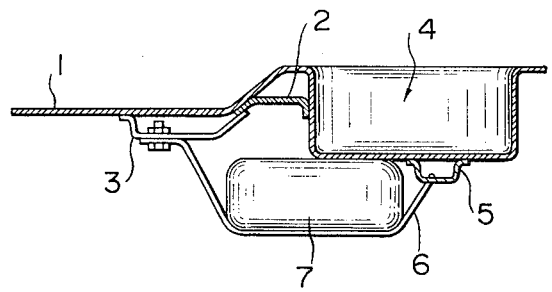

FUEL TANK FITTING STRUCTURE

BACKGROUND OF THE INVENTION

This invention relates to a structure for fitting a fuel tank in an automotive vehicle.

FIGS. 1 and 2 show a conventional structure for fitting a fuel tank. A first cross member 2 is welded to the under side of a rear floor panel 1. A pair of rear seat belt stiffeners 3 are fixed to the first cross member 2 and used to support a belt (not shown). A spare tyre space portion 4 is formed in the rear floor panel 1. A second cross member 5 is welded to the under side of the spare tyre space portion 4. A pair of bands or support members 6 are suspended between the rear seat belt stiffener 3 and the second cross member 5 so as to hold a fuel tank 7 in position between the first cross member 2 and the second cross member 5. Also, both ends of the first cross member 2 and the second cross member 5 are welded to the corresponding side members.

FIGS. 3 and 4 show a further conventional structure for fitting a fuel tank in an automotive vehicle. The pair of bands or supporting members 6 are suspended between the rear seat belt stiffener 3, a bracket 9 and the second cross member 5 in such a manner that the fuel tank 7 is held in position between the rear seat belt stiffener 3 and the second cross member 5. The rear seat belt stiffener 3 is fixed to the under side of the rear floor panel 1 and the cross member 2 welded to the corresponding upper side of the rear floor panel 1. The ends of the second cross member 5 are fixed to the outer wall of the spare tyre space portion 4 formed in the rear floor panel 1 and the side member 8. The bracket 9 is fixed to the under side of the spare tyre space portion 4.

In the conventional structures as above-stated however, the fuel tank 7 is held in a suspended condition under the rear floor panel 1 by means of the band 6. Thus, in order to suspend the band or support members 6, the second cross member 5, the stiffener 3 and the bracket 9 must be additionally provided. For instance, they must be welded to the rear floor panel 1. As a result, the number of the parts to be assembled increases, and the assembling work is complicated. Also, in order to properly hold the fuel tank in position, the second cross member 5, the rear seat belt stiffener 3 and the bracket 9 must have a reasonable strength and be large in size. In particular, the stiffener 3 must be designed in such a way because it is also used for supporting a belt. As a result, the weight of the vehicle body and the production cost thereof increase.

SUMMARY OF THE INVENTION

According to a preferred embodiment of the present invention, a structure for fitting a fuel tank in an automotive vehicle is improved in such a way that the position of a fuel tank slightly changes in the front direction of the vehicle body. The fuel tank is held between a rear seat cross member and a cross member for fixing a seat belt anchor.

Accordingly, it is an object of the present invention to provide a structure for fitting a fuel tank in which the number of parts to be assembled decreases.

A further object of the present invention is to provide a structure for fitting a fuel tank wherein the strength of members for suspending the fuel tank can increase.

Another object of the present invention is to provide a structure for fitting a fuel tank in which the assembling work can be simplified.

BRIEF DESCRIPTION OF THE DRAWINGS

These and other objects, features and advantages of the present invention will become more apparent from the following description of preferred embodiments thereof when read in conjunction with the accompanying drawings in which:

FIG. 1 is an explanatory view showing schematically the bottom of a conventional structure for fitting a fuel tank in an automotive vehicle;

FIG. 2 is a sectional view taken along the line II—II in FIG. 1;

BRIEF DESCRIPTION OF THE PREFERRED EMBODIMENTS

Figure 3:
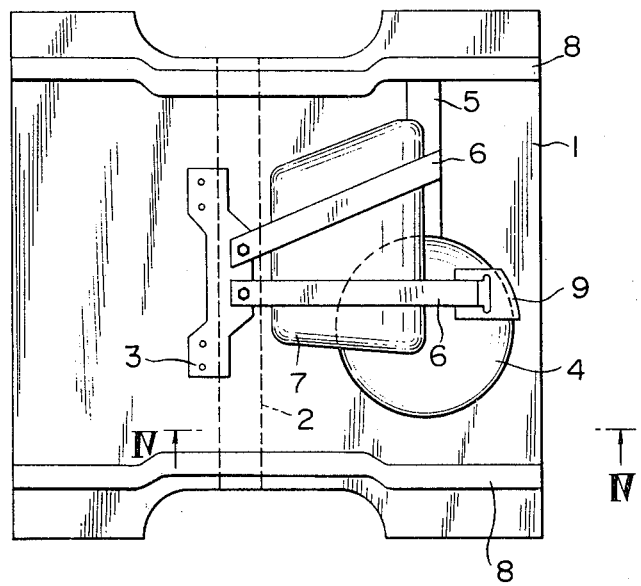
FIG. 3 shows schematically another conventional structure for fitting a fuel tank in an automotive vehicle.
Figure 4:
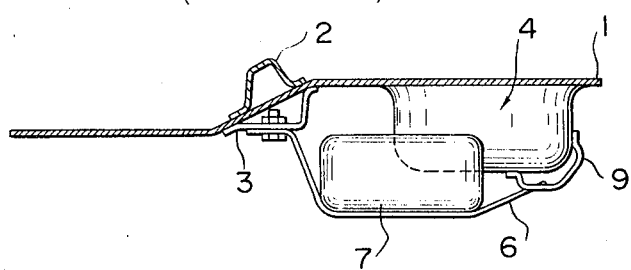
FIG. 4 is a sectional view taken along the line IV—IV in FIG. 3.
Figure 5:
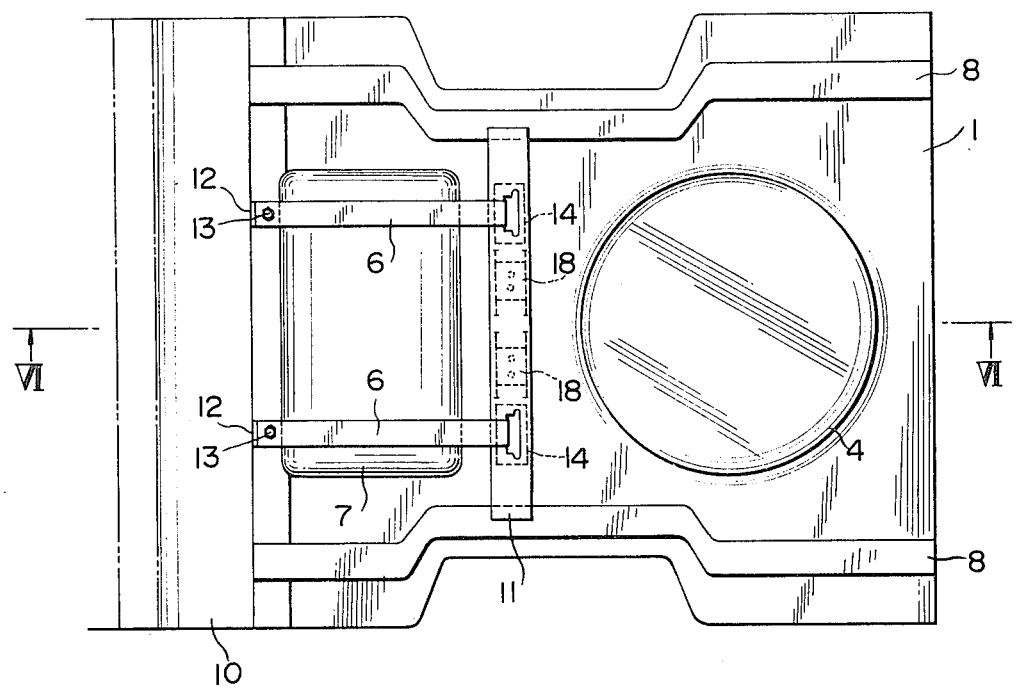
FIG. 5 is an explanatory view showing schematically a structure for fitting a fuel tank in automotive vehicle according to the present invention.
Figure 6:
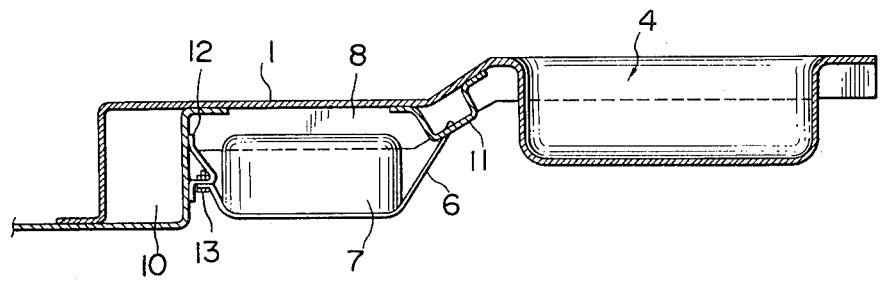
FIG. 6 is a sectional view taken along the line VI—VI in FIG. 5.
Figure 7:
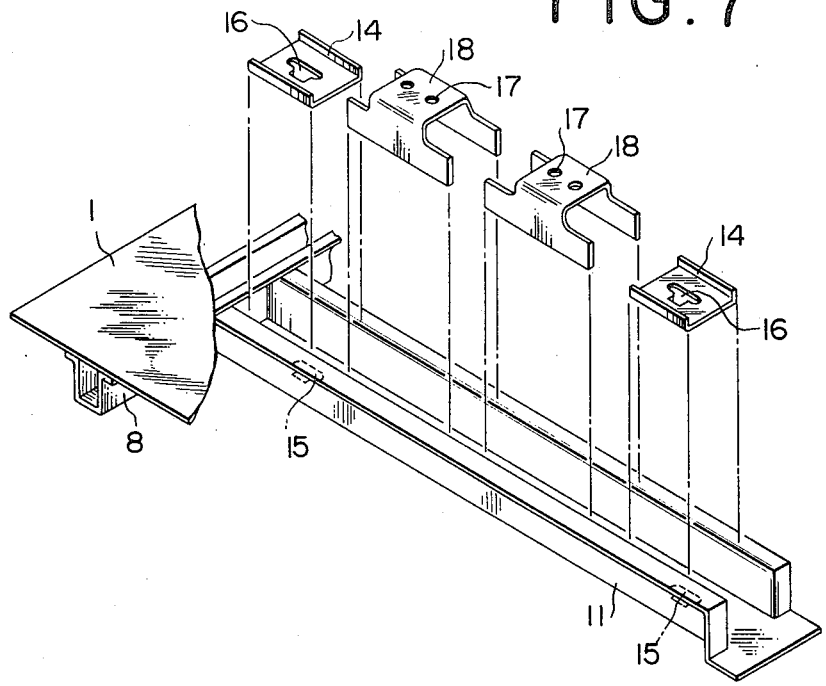
FIG. 7 is an explanatory view showing an arrangement of an anchor cross member, a seat belt anchor fixing bracket and a band fixing bracket used in the structure shown in FIG. 5.

FIGS. 5 through 7 show a first embodiment of the present invention. A pair of bands or support members 6 are used to support a fuel tank 7 thereon. A rear seat cross member 10 is welded to the under side of the rear floor panel 1. The bands or support members 6 are suspended or fixed between the rear seat cross member 10 and the cross member for fixing a seat belt anchor (not shown).

As shown in FIG. 6, one end of the band 6 is fixed by means of a bolt and nut combination 13 to a bracket 12 welded to the rear outer wall of a rear seat cross member 10. The other end of the band 6 is fixed to the bracket 14 welded to the anchor cross member 11.

As shown in FIG. 7, both ends of the anchor cross member 11 are fixed or welded to a pair of side members 8. A through hole 15 for the band 6 is formed near each end portion of the side member 11. Channel shaped brackets 14 are fixed to the bottom portion of the anchor cross member 11 at the positions corresponding to the through holes 15. The brackets 14 have at the bottom thereof through holes 16 formed therein in the same shape as that of the through holes 15. Two brackets 18 for fixing the seat belt anchor are arranged between the pair of brackets 14 on the anchor cross member 11. Through holes 17 are formed in each bracket 18, through which a bolt is inserted for the purpose of fixing an end of a rear seat belt (not shown).

Consequently, the other end of the band 6 is fixed after it is inserted into the through hole 15 of the anchor cross member 11 and the hole 16 of the bracket 14 fixed to the anchor cross member 11.

In summary, the fuel tank 7 is fixedly held in position between the rear seat cross member 10 and the anchor cross member 11 in such a condition that it is suspended by means of the bands 6 fixed between the rear seat cross member 10 and the anchor cross member 11.

Figure 8:
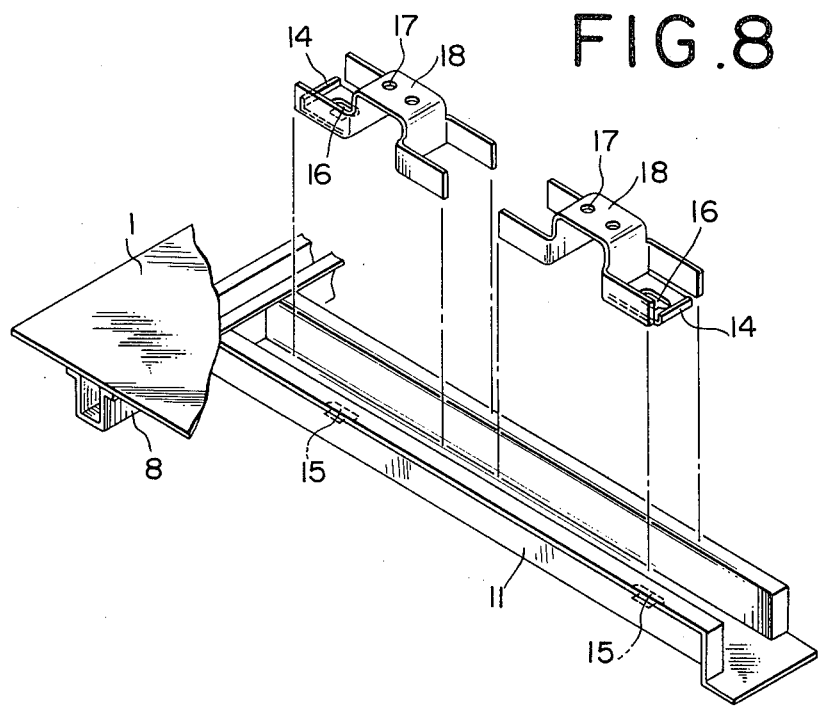
FIG. 8 is an explanatory view, partly broken out, of a structure for fitting a fuel tank according to a second embodiment of the present invention.

FIG. 8 shows a second embodiment of the present invention. A bracket 14 for fixing a band to be fixed to an anchor cross member 11 and a bracket 18 for fixing a seat belt anchor are integrally made as one body. As a result, the number of required parts can be decreased. Except this point, the second embodiment is substantially the same as in the first embodiment so that like members are designated by the same references therethrough, and the other points or features are not described.

Figure 9:
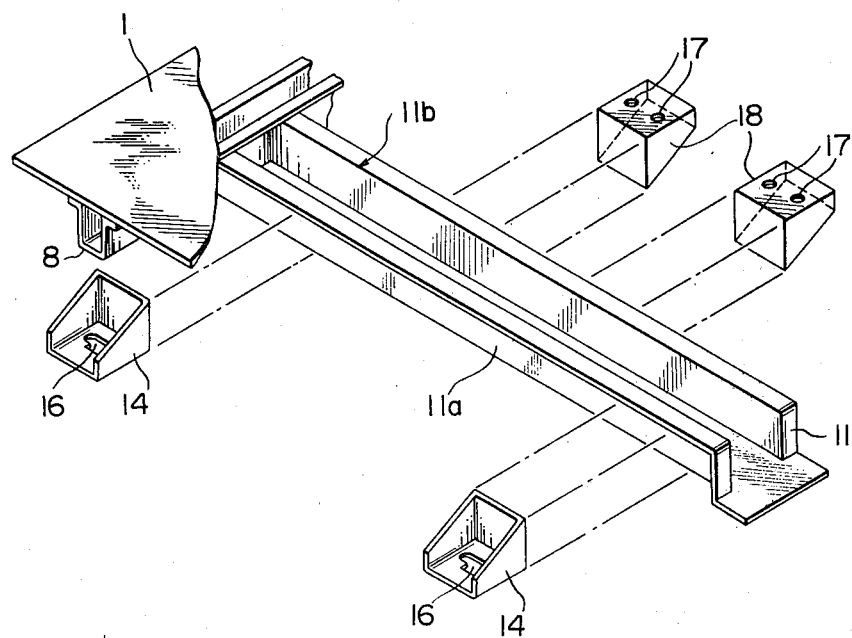
FIG. 9 is an explanatory view showing a third embodiment of the present invention, similar to FIG. 8.

FIG. 9 shows a third embodiment of the present invention. The brackets 14 for the bands are welded to the front side outer wall 11a of the anchor cross member 11 near both ends thereof, respectively. The brackets 18 for the seat belt anchor are welded to the rear side outer wall 11b of the anchor cross member 11. By so doing, the through hole 15 for the anchor cross member 11 is omitted to improve the workability. The third embodiment is also substantially the same as the first embodiment except the construction of the brackets 14 and 18 and the arrangement thereof. Thus, the details thereof are not described herein.

As can be seen from the foregoing, according to the present invention, a fuel tank for an automotive vehicle is placed between a rear seat cross member and an anchor cross member by band means suspended therebetween. As a result, a second cross member as required in the prior art for supporting the fuel tank can be omitted so that the number of required parts can be decreased and the assembling work can be simplified. As the rear seat cross member and the anchor cross member have generally substantial rigidity, the supporting strength for the fuel tank can be increased. Also, the size of those brackets for supporting the fuel tank can be made relatively small and light.

What is claimed is:

1. A structure for fitting a fuel tank in an automotive vehicle, comprising:
    a rear floor panel fixed at a rear portion of the automotive vehicle;
    a rear seat cross member fixed to the under side of the rear floor panel across the automotive vehicle;
    a seat belt anchor fixing cross member fixed to the under side of the rear floor panel across the automotive vehicle; and
    supporting means suspended between the rear seat cross member and the seat belt anchor fixing cross member for supporting the fuel tank in position between the rear seat cross member and the seat belt anchor fixing cross member.

2. A structure of claim 1, wherein the supporting means are a pair of bands, both ends of which are attached to the rear seat cross member and the seat belt anchor fixing cross member, respectively.

3. A structure of claim 1, wherein a spare tyre space portion is formed in the rear floor panel, and the seat belt anchor fixing cross member is arranged near the spare tyre space portion.

4. A structure of claim 1, further comprising first bracket means fixed to the rear seat cross member and the seat belt anchor fixing cross member for suspending the supporting means.

5. A structure of claim 2, further comprising a pair of first brackets fixed to the rear seat cross member and the seat belt anchor fixing cross member for suspending the pair of bands.

6. A structure of claim 5, further comprising second bracket means attached to the seat belt anchor fixing cross member between the pair of first brackets, the second bracket means being used to fix a seat belt anchor.

7. A structure of claim 6, wherein the first brackets and the second bracket means are formed integrally as one body.

8. A structure of claim 6, wherein the first brackets and the second bracket means are placed on the opposite side portions of the seat belt anchor fixing cross member, respectively.

* * * * *